Patented Aug. 14, 1951

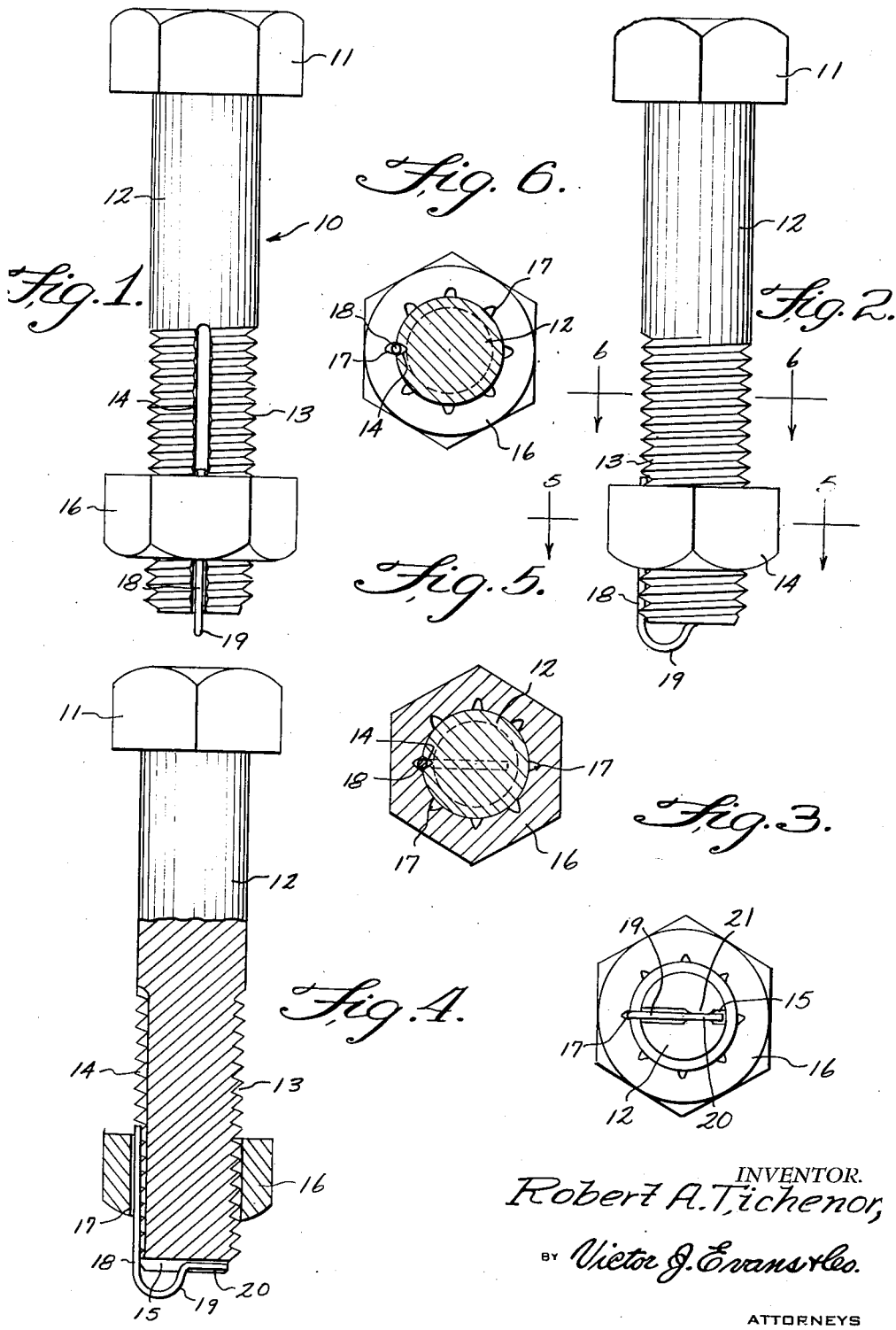

2,564,550

UNITED STATES PATENT OFFICE 2,564,550

LOCK NUT AND BOLT

Robert A. Tichenor, Warren, Ark.

Application July 24, 1947, Serial No. 763,395

1 Claim. (Cl. 151—8)

A primary object of the invention is the provision of an improved locknut and bolt adapted when positioned on a piece of work to be secured against disassembly regardless of the distortion of the structure with which the bolt and nut are associated.

An additional object of the invention is the provision of a locknut and bolt characterized by means whereby the locking operation may be readily and substantially instantaneously effective, and which when desired, may be disassembled, or unlocked with a minimum of difficulty and effort.

A further object of the invention is the provision of such a locknut and bolt which may be manufactured from a conventional nut and bolt with a minimum of difficulty and machine operation.

Other objects will be in part obvious and in part be pointed out as the description of the invention proceeds, and shown in the accompanying drawing wherein there is disclosed a preferred embodiment of this inventive concept.

In the drawings:

Figure 1 is a side elevational view of one form of locknut and bolt embodying features of the instant invention shown in assembled relation.

Figure 2 is a view taken substantially at right angles to Figure 1.

Figure 3 is an end elevational view of the construction disclosed in Figure 2.

Figure 4 is a view similar to Figure 2, but showing the lower portion of the bolt and the nut in section.

Figure 5 is a sectional view taken substantially along the lines 5—5 of Figure 2 as viewed in the direction indicated by the arrows, and Figure 6 is a sectional view taken substantially along the line 6—6 of Figure 2 as viewed in the direction indicated by the arrows.

Similar reference characters refer to similar parts throughout the several views of the drawing.

Referring now to the drawings, there is generally indicated at 10 a bolt, including a head 11, and a shank 12 of conventional construction. The lower portion of the shank 12 is threaded as indicated at 13, and provided with a longitudinally extending channel or groove 14, intersecting the entire threaded length of the bolt. Groove 14 intersects a corresponding groove 15 extending across the end or bottom of the bolt 10 at substantially right angles to groove 14.

The bolt is adapted to be engaged by a nut 16 of conventional exterior design, and internally threaded to correspond to the threaded portion 13 of the bolt, but provided with a plurality of channels for grooves 17, at spaced intervals around the central bore thereof, and substantially perpendicular to the thread thereof, and intersecting all of the internal threads of the nut.

The locking feature of the instant invention comprises a pin which includes a straight portion 18 of a diameter in excess of the depth of either channels 14 or 17, in such manner that the straight portion 18 may be inserted between the bolt and nut only when one of the channels 17 is in alinement with channel 14. The portion 18 of the pin merges into a loop 19, which terminates in an end 20 substantially perpendicular to the portion 18, and adapted to seat in the end groove or channel 15.

In the use and operation of the device the nut and bolt may be assembled in the conventional manner, care being taken to aline one of the channels 17 with the channel 14, and suitably tightened to the desired degree. When such alinement has been effected, the straight portion 18 of the pin may be inserted in the coacting channels, in the perpendicular portion 20 seated in the channel 15, the edges of which may then be distorted or crimped as indicated at 21 securely holding the pin against dislodgment due to normal distortion of the structure in which the bolt and nut are incorporated.

Obviously when it is desired to disassemble the apparatus the looped portion 19 provides for the ready insertion of a tool to permit withdrawal of the pin from the associated channels, whereupon the nut 16 may be removed in the conventional manner.

From the foregoing it will now be seen that there is herein provided an improved locknut and bolt assembly which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a lock bolt, the combination which comprises a bolt having a head with a shank having a threaded end, said bolt having a channel extended across the end of the shank and longitudinally along one side and through the said threads, a nut threaded on the shank of said bolt and having spaced longitudinally disposed channels extended therethrough with the channels cutting through the threads and positioned to register with the said channel extended into the threads of the shank, and a locking pin having a substantially semi-circular loop at one end with an end at the open side of the loop extended perpendicularly from the axis of said pin, said pin positioned in the channel extended into the threads of the shank and extended into one of the longitudinally disposed channels of the nut and with the said extended end at the open side of the loop in the channel at the end of the shank the said longitudinally disposed channel extended through the threads of the bolt extended continuously through the last threads on the end of the bolt whereby with a nut threaded on the bolt and with one of the channels of the nut in registering relation with the channel of the bolt the pin is inserted straight inwardly from the end of the bolt for preventing rotation of the nut on the bolt, the walls of said channel at the end of the shank being crimped over slightly to temporarily secure the end of the pin at the open side of the loop in the channel thereby preventing accidental displacement of the pin from the bolt.

ROBERT A. TICHENOR.

REFERENCES CITED

The following references are of record in the file of this patent:

UNITED STATES PATENTS

| Number | Name | Date |
|---|---|---|
| 229,764 | Sipe | July 6, 1880 |
| 271,955 | Waddill | Feb. 6, 1883 |
| 321,735 | Lindsly | July 7, 1885 |
| 573,840 | Edwards | Dec. 22, 1896 |
| 654,744 | Loving | July 31, 1900 |
| 857,782 | Baker | June 25, 1907 |
| 2,278,344 | Baker | Mar. 31, 1942 |